(12) United States Patent
Yoshimura et al.

(10) Patent No.: US 10,700,318 B2
(45) Date of Patent: Jun. 30, 2020

(54) BATTERY CASE

(71) Applicants: TOYODA IRON WORKS CO., LTD., Toyota-shi, Aichi (JP); TOYOTA JIDOSHA KABUSHIKI KAISHA, Toyota-shi, Aichi (JP)

(72) Inventors: Yasuhiro Yoshimura, Toyota (JP); Hideaki Sakai, Okazaki (JP); Yasuhiro Sone, Toyota (JP); Minoru Takenaka, Toyota (JP); Atsushi Yamanaka, Nagoya (JP); Yusuke Suzuki, Nagakute (JP); Shogo Tomihira, Toyota (JP)

(73) Assignees: TOYOTA IRON WORKS CO., LTD., Toyota (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/777,934

(22) PCT Filed: Dec. 8, 2016

(86) PCT No.: PCT/JP2016/086554
§ 371 (c)(1),
(2) Date: May 22, 2018

(87) PCT Pub. No.: WO2017/104535
PCT Pub. Date: Jun. 22, 2017

(65) Prior Publication Data
US 2018/0375075 A1    Dec. 27, 2018

(30) Foreign Application Priority Data

Dec. 15, 2015 (JP) .................................. 2015-243814

(51) Int. Cl.
*H01M 2/10* (2006.01)
*H01M 2/02* (2006.01)

(52) U.S. Cl.
CPC .......... *H01M 2/1077* (2013.01); *H01M 2/02* (2013.01); *H01M 2/10* (2013.01); *H01M 2/1094* (2013.01); *H01M 2220/20* (2013.01)

(58) Field of Classification Search
None
See application file for complete search history.

(56) References Cited

U.S. PATENT DOCUMENTS 6,255,015 B1 *   7/2001   Corrigan ............. H01M 2/0242
                                                        429/120
8,835,033 B2    9/2014   Choi et al.
(Continued)

FOREIGN PATENT DOCUMENTS

| CN | 102468455 A | 5/2012 |
|----|-------------|--------|
| JP | H10-6785 A | 1/1998 |

(Continued)

OTHER PUBLICATIONS

JP2012018797A—NPL (Year: 2012).*
(Continued)

*Primary Examiner* — Haroon S. Sheikh
(74) *Attorney, Agent, or Firm* — Oliff PLC

(57) ABSTRACT

A battery case enables a battery cell to be placed in a continuously pressured state without increasing the complexity of the battery module manufacturing process. Specifically, the battery case has: a plastic first accommodation unit and second accommodation unit in which a laminated body of a battery cell is accommodated; a UD tape integrally positioned on a first side wall, a second side wall, and a third side wall, which form the first accommodation unit; and a UD tape integrally positioned on the first side wall, which form the second accommodation unit. The UD tapes are (Continued)

configured, in particular, to be positioned straddling the third side walls from the second side walls across the first side wall.

4 Claims, 7 Drawing Sheets

(56) References Cited

U.S. PATENT DOCUMENTS

| | | | |
|---|---|---|---|
| 9,005,770 | B2 | 4/2015 | Taka et al. |
| 9,254,609 | B2 | 2/2016 | Choi et al. |
| 2011/0294000 | A1 | 12/2011 | Kim et al. |
| 2012/0121956 | A1 | 5/2012 | Park et al. |
| 2013/0252059 | A1 | 9/2013 | Choi et al. |
| 2014/0255817 | A1* | 9/2014 | Blanchet ............... H01M 8/248 429/469 |
| 2014/0352886 | A1 | 12/2014 | Choi et al. |

FOREIGN PATENT DOCUMENTS

| | | |
|---|---|---|
| JP | 2010-244894 A | 10/2010 |
| JP | 2012-018797 A | 1/2012 |
| JP | 2013-201112 A | 10/2013 |

OTHER PUBLICATIONS

Oct. 30, 2018 Office Action issued in Japanese Patent Application No. 2015-243814.
Apr. 24, 2019 Extended Search Report issued in European Patent Application No. 16875515.5.
May 28, 2019 Office Action issued in Japanese Patent Application No. 2015-243814.
Jun. 19, 2018 International Preliminary Report on Patentability issued in International Patent Application No. PCT/JP2016/086554.
Apr. 21, 2020 Office Action issued in Chinese Patent Application No. 201680067037.3.

* cited by examiner

BATTERY CASE

FIELD

The present invention relates to a battery case for storing a laminate of battery cells.

BACKGROUND

In recent years, there are an electric vehicle using a motor driven based on electric power supplied from a battery as a drive source and a hybrid vehicle using both of a motor and an engine as a drive source other than a gasoline vehicle using an engine as a drive source. As a power source of the electric vehicle and the hybrid vehicle using a motor as a drive source as described above, a battery module storing a plurality of laminated battery cells in a battery case is used since an installation space is limited, and a high voltage and a high energy capacity are required.

It is known that battery performance of the battery cells is improved by using the battery cells in a pressurized state. A technique has been suggested in JP2010-244894A that individual battery cell is laminated in a pressurized state by fastening a plurality of laminated battery cells with a binding band from the outside.

PRIOR ART DOCUMENT

Patent Document

Patent Document 1: Japanese Laid-Open Patent Publication No. 2010-244894A

SUMMARY

Problems to be Solved by the Invention

However, since in the technique disclosed in the patent document 1, it is necessary to newly attach a binding band to laminated battery cells after laminating the plurality of battery cells, there was a problem that the manufacturing process becomes complex. In addition, the increase in the number of parts leads to cost increase.

Meanwhile, although it is possible to accept a configuration that battery cells are pressurized by a load from a battery case by storing laminated battery cells in the battery case in a compressed state without employing the binding band, there was a problem that the battery case deforms under load, decreasing a pressurization value. In addition, there is also a risk that the breakage of the battery case is caused.

The present invention is made in order to solve the above-mentioned problem in the conventional technique, and an object thereof is to provide a battery case capable of keeping a pressurized state of battery cells without complicating a manufacturing process of a battery module.

Means for Solving the Problems

A battery case according to the first aspect of the invention is the battery case including: a storage part made of resin for storing a laminate of battery cells, a fiber tape arranged integrally with side walls forming the storage part and formed by impregnating fiber arranged in a longitudinal direction with the resin, wherein the side walls include a first side wall erected along a lamination direction of the battery cells, and a second side wall and a third side wall continued from the first side wall, erected in a direction intersecting with the lamination direction of the battery cells, the second side wall and the third side walls are holding the laminate of the battery cells at both ends in the lamination direction, and the fiber tape is arranged from the second side wall to the third side wall through the first side wall.

According to the battery case having a configuration described above, it becomes possible to significantly improve a strength of the storage part against a load in the lamination direction of the battery cells by arranging the fiber tape to the storage part. As a result, it becomes possible to keep a pressurized state of the battery cells laminated and stored in the storage part, and improve the battery performance of the battery cells. In addition, it also has an effect of suppressing the swelling of the battery cells. Further, in comparison with the conventional technique, since it is not necessary to attach a part for pressurizing the battery cells such as a binding band separately, complicating a manufacturing process of a battery module can be prevented. In addition, the number of parts can be decreased and a cost reduction effect can also be expected.

The battery case according to the second aspect of the invention is the battery case, wherein the storage part is formed integrally with the fiber tape by insert molding in which the resin is injected into a mold where the fiber tape is placed.

According to the battery case having a configuration as described above, the fiber tape and the storage part are surely fused to each other by insert molding, and it becomes possible to sufficiently bring out an effect of improving the strength of the battery case by the fiber tape.

The battery case according to the third aspect of the invention is the battery case, wherein the resin impregnated into the fiber tape and the resin forming the storage part are the same kind.

According to the battery case having a configuration as described above, it becomes possible that the fiber tape and the storage part are surely fused to each other and the effect of improving the strength of the battery case by the fiber tape is brought out sufficiently by using the same kind of resin for the resin impregnated into the fiber tape and the resin forming the storage part.

The battery case according to the fourth aspect of the invention is the battery case, wherein at least one direction of the storage part is open, and the fiber tape is arranged along opening ends of the side walls.

According to the battery case having a configuration as described above, it becomes possible that a place to be deformed easily the most when the battery cells are stored in the storage part can be reinforced with the fiber tape by arranging the fiber tape along the opening ends of the side walls, and thus the deformation of the storage part can be surely prevented.

The battery case according to the fifth aspect of the invention is the battery case, wherein the battery case includes a first storage part and a second storage part adjacent to the first storage part as the storage part, the lamination direction of the battery cells in the first storage part and the second storage part is the same direction, and the first side wall of the first storage part and the first side wall of the second storage part are erected as one body between the first storage part and the second storage part.

According to the battery case having a configuration as described above, even when the plurality of the storage parts for storing the battery cells are provided in order to realize a high energy capacity of a battery module, it becomes possible to significantly improve the strength of each storage part against a load in the lamination direction of the battery cells while suppressing the use amount of the fiber tape. In addition, a downsizing of the battery module can be realized by using the first side wall to which the fiber tape is arranged in common for each of the storage parts.

The battery case according to the sixth aspect of the invention is the battery case, wherein the fiber tape is arranged from the second side wall of the first storage part to the second side wall of the second storage part and/or from the third side wall of the first storage part to the third side wall of the second storage part.

According to the battery case having a configuration as described above, it becomes possible to further improve the strength of each storage part by adding the fiber tape arranged so as to cover the side walls of the plurality of the storage parts.

Effects of the Invention

According to the battery case in the present invention, it becomes possible to significantly improve the strength of the storage part against a load in the lamination direction of the battery cells by arranging the fiber tape to the storage part. As a result, it becomes possible to keep the pressurized state of the battery cells laminated and stored in the storage part and improve the battery performance of the battery cells. In addition, an effect of suppressing the swelling of the battery cells is also brought out. Further, in comparison with the conventional technique, since it is not necessary to separately attach a part for pressurizing the battery cells such as a binding band, complicating the manufacturing process of the battery module can be prevented. In addition, the number of parts can be decreased and a cost reduction effect can also be expected.

BEST MODE FOR CARRYING OUT THE INVENTION

The first to third embodiments of the battery case according to the present invention will be described in detail with reference to the drawings. The battery case according to the present invention is a storage case for laminating and storing a plurality of battery cells. The battery case is disposed in a lower space in a vehicle body of an electric vehicle and a hybrid vehicle, and constitutes a part of a battery module used as a power source of an electric vehicle and a hybrid vehicle together with battery cells and a voltage circuit. However, the battery case is not only used as a battery module of the electric vehicle and the hybrid vehicle, but also van be used as a battery module of various electronic apparatuses and a drive device requiring an electric power source.

The First Embodiment

Figure 1:
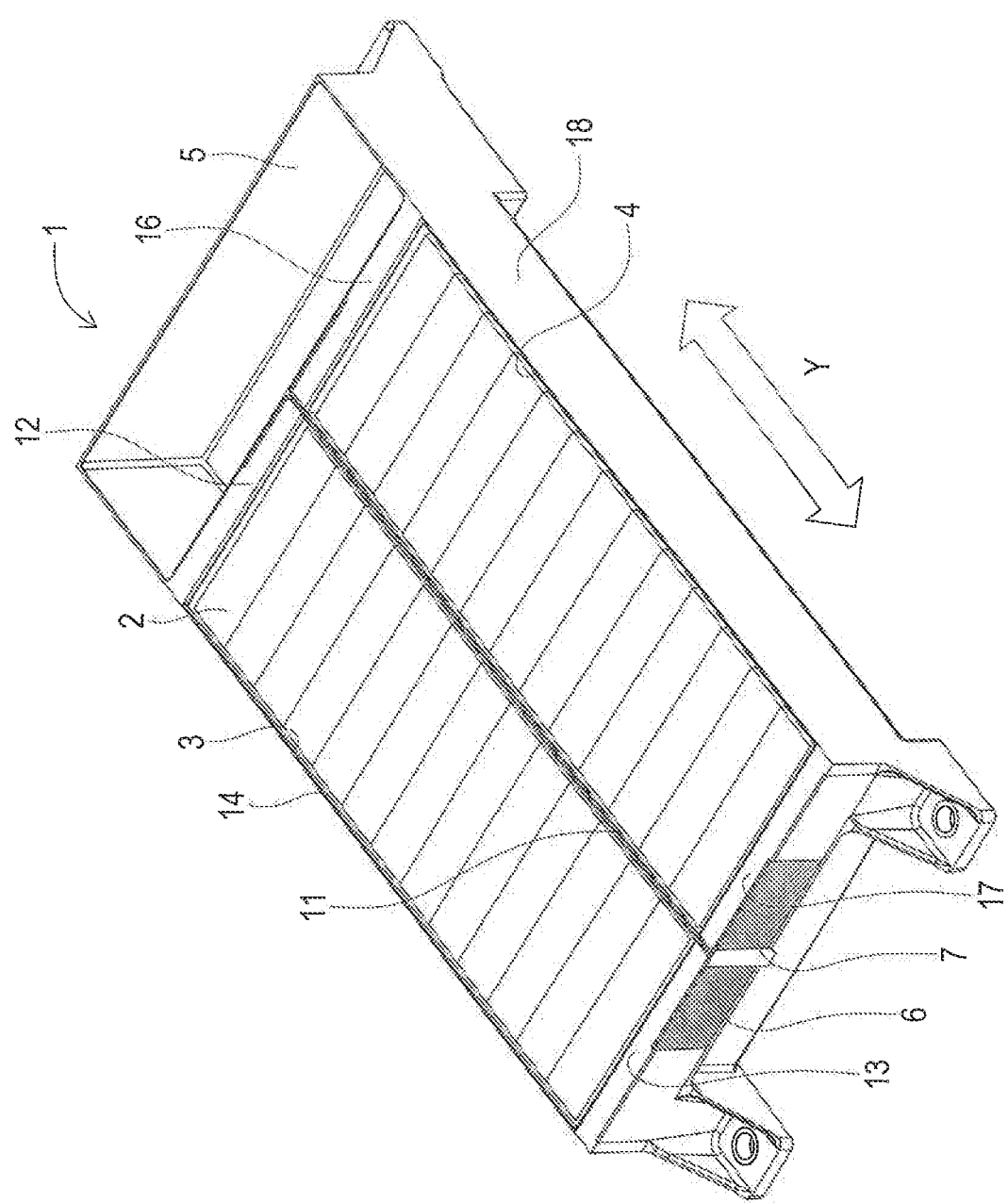
FIG. 1 is a perspective view showing the entire configuration of the battery case according to the first embodiment in a state in which battery cells are inserted.
Figure 2:
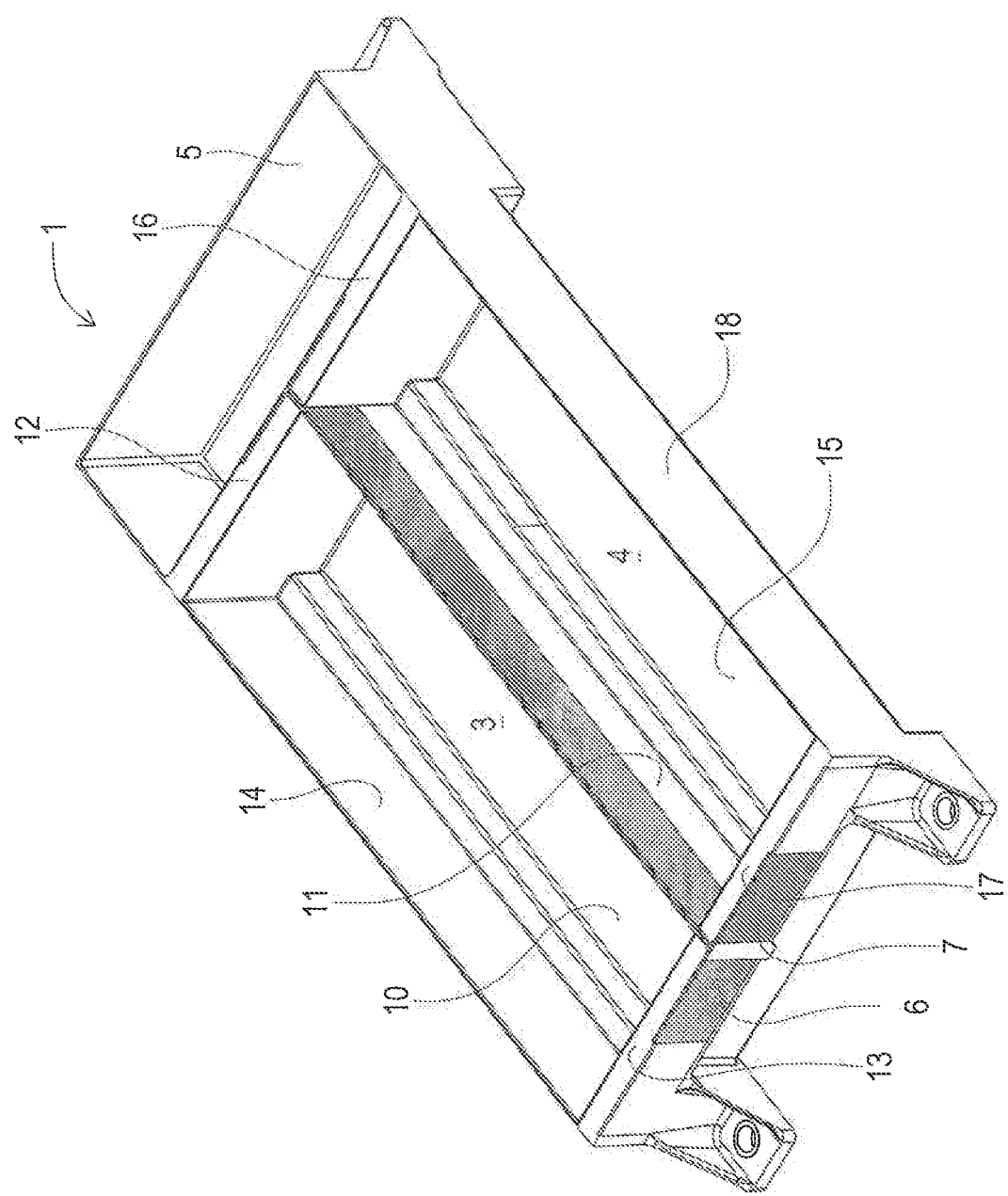
FIG. 2 is a perspective view showing the entire configuration of the battery case according to the first embodiment in a state in which the battery cells are not inserted.
Figure 3:
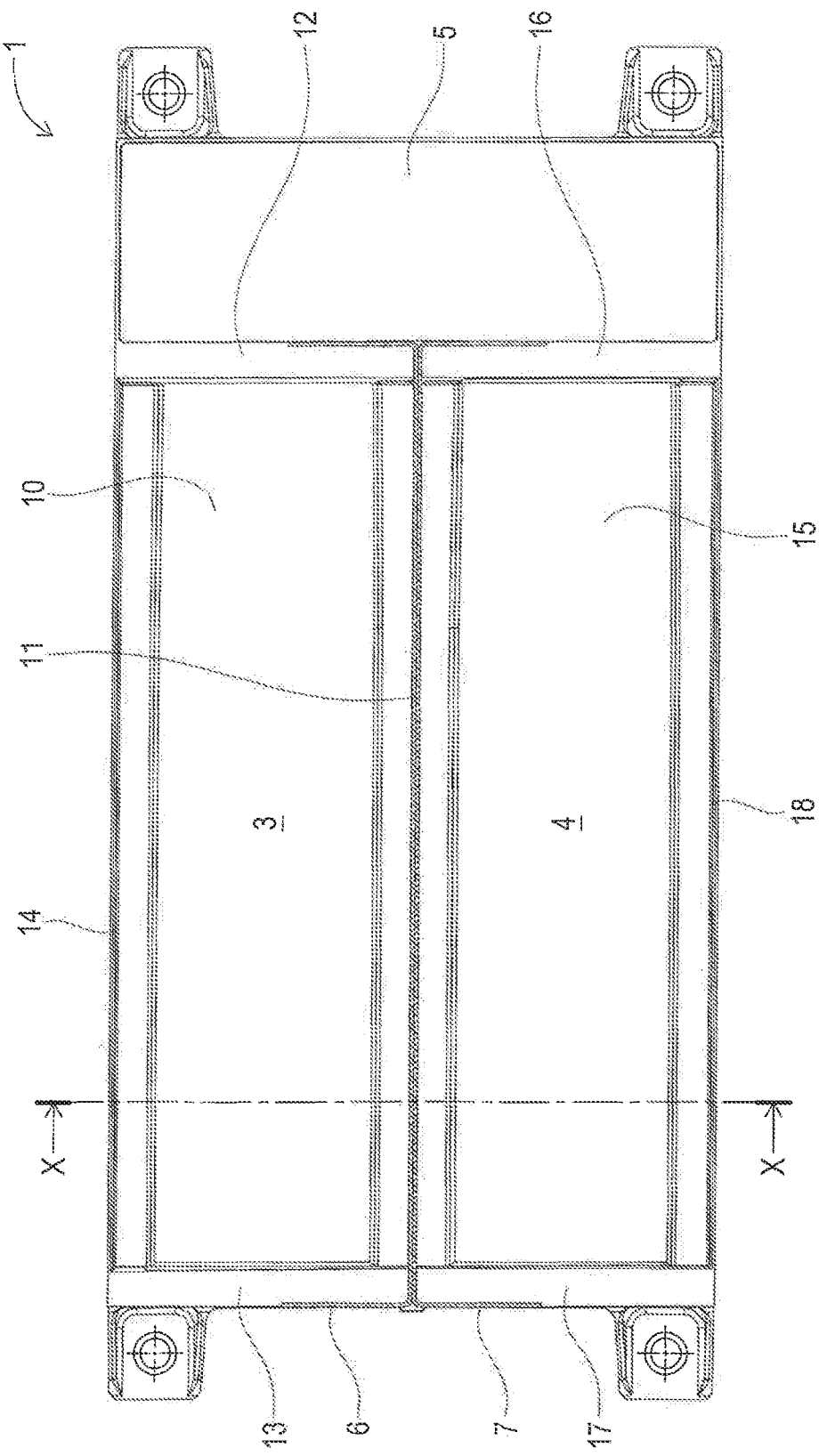
FIG. 3 is a top view showing the entire configuration of the battery case according to the first embodiment in a state in which the battery cells are not inserted.
Figure 4:
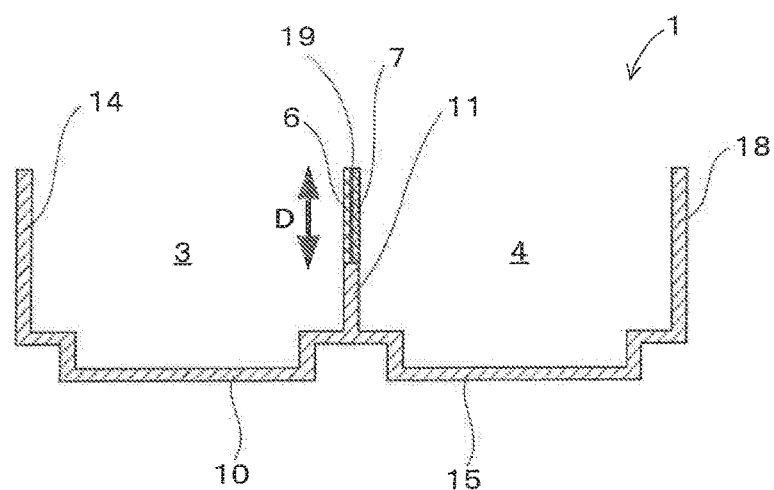
FIG. 4 is a cross sectional view of the battery case taken along a line X-X of FIG. 3.

Firstly, the entire configuration of a battery case 1 according to the first embodiment will be described with reference to FIGS. 1-4. FIG. 1 is a perspective view showing the entire configuration of the battery case 1 according to the first embodiment in a state in which battery cells 2 are inserted. FIG. 2 is a perspective view showing the entire configuration of the battery case 1 according to the first embodiment in a state in which the battery cells 2 are not inserted. FIG. 3 is a top view showing the entire configuration of the battery case 1 according to the first embodiment in a state in which the batter cells 2 are not inserted. FIG. 4 is a cross sectional view of the battery case 1 taken along a line X-X of FIG. 3. Although a cover for covering an upper part of the battery case 1 is attached after the battery cells 2 were stored in the battery case 1, the cover will be omitted to show the inside of the battery case 1.

As illustrated in FIGS. 1-4, the battery case 1 includes a first storage part 3 and a second storage part 4 storing a plurality of battery cells 2, a circuit storage part 5 for storing a voltage circuit not shown, and UD (Uni-Directional) tapes 6, 7 that are fiber tapes for reinforcing the battery case 1.

The first storage part 3, the second storage part 4, and the circuit storage part 5 are a formed body made of resin and are formed integrally by a nylon 6 (PA6). The first storage part 3 and the second storage part 4 are storage parts for laminating and storing the plurality of battery cells 2 (for example, the number shown in FIG. 1 is 13) in the same direction, and as shown in FIG. 1, the first storage part 3 and the second storage part 4 are arranged in parallel so as to be parallel with the lamination direction Y of the battery cells 2. Although two storage parts of the first storage part 3 and the second storage part 4 are provided as a storage part for storing the battery cells 2 in the battery case 1 according to the first embodiment described below, the number of the storage part can be one or, three or more depending on the number of the battery cells 2 stored therein.

The configurations of the first storage part 3 and the second storage part 4 will be described in more detail. The first storage part 3 and the second storage part 4 are basically symmetrical and have the same configuration.

As shown in FIGS. 2 to 4, the first storage part 3 comprises a bottom plate 10 forming a bottom of the battery case 1 and a space surrounded by a first side wall 11, a second side wall 12, a third side wall 13, and a fourth side wall 14 each erected with respect to the bottom plate 10, and a surface facing the bottom plate 10 is open. The battery cells 2 are stored in the first storage part 3 from an opening thereof, and then the opening is closed by a cover. An electrode of the battery cells 2 stored in the first storage part 3 is connected to a voltage circuit stored in the circuit storage part 5 through a terminal and a wiring provided with the cover.

In the same as the first storage part 3, the second storage part 4 comprises a bottom plate 15 forming a bottom of the battery case 1 and a space surrounded by the first side wall 11, a second side wall 16, a third side wall 17, and a fourth side wall 18 each erected with respect to the bottom plate 15, and a surface facing the bottom plate 15 is open. In the battery case 1 according to the first embodiment, although the first side wall 11 of the first storage part 3 and the first side wall 11 of the second storage part 4 are formed as one body (as a common side wall), the first side wall 11 of the first storage part 3 and the first side wall 11 of the second storage part 4 may be formed separately.

The first side wall 11 is a rib forming a boundary of the first storage part 3 and the second storage part 4 arranged in parallel and is erected in the direction along the lamination direction of the battery cells 2. The second side walls 12, 16 and the third side walls 13, 17 are continued from ends of the first side wall 11, are erected in the direction intersecting with the lamination direction of the battery cells 2, and hold the laminate of the battery cells 2 at both ends in the lamination direction. The fourth side walls 14, 18 form an external wall of the battery case 1 and are erected in the direction along the lamination direction of the battery cells 2. The first side wall 11 and the fourth side walls 14, 18 are arranged so as to face to each other, and the second side walls 12, 16 and the third side walls 13, 17 are arranged so as to face to each other.

UD tapes 6, 7 are reinforcement fiber tapes including unidirectional continuous fibers. Specifically, the UD tapes 6, 7 are formed by impregnating fibers arranged in a longitudinal direction with the resin. In the first embodiment, especially, the resin impregnated into the fibers is the nylon 6 that is the same kind as the resin forming the first storage part 3 and the second storage part 4. The UD tapes 6, 7 are integrally arranged to side walls forming the first storage part 3 and the second storage part 4. Specifically, the UD tape 6 is arranged in a U shape from the second side wall 12 of the first storage part 3 to the third side wall 13 through the first side wall 11 of the first storage part 3. In the same as the UD tape 6, the UD tape 7 is also arranged in a U shape from the second side wall 16 to the third side wall 17 through the first side wall 11 of the second storage part 4.

Since the first side wall 11 of the first storage part 3 and the first side wall 11 of the second storage part 4 are erected as one body, in the first side wall 11, the UD tape 6 arranged to the first storage part 3 and the UD tape 7 arranged to the second storage part 4 are arranged in an overlapping manner. As shown in FIG. 4, each of the UD tapes 6 and 7 is arranged along an opening end 19 of the side wall. Although a width D of the UD tapes 6, 7 can be set appropriately depending on a shape of the battery case 1, basically, as the width D becomes larger, more improvement of the strength of the battery case 1 by the UD tapes 6, 7 can be expected. For example, it is desirable that the width D is more than half of the height of the side wall.

Figure 5:
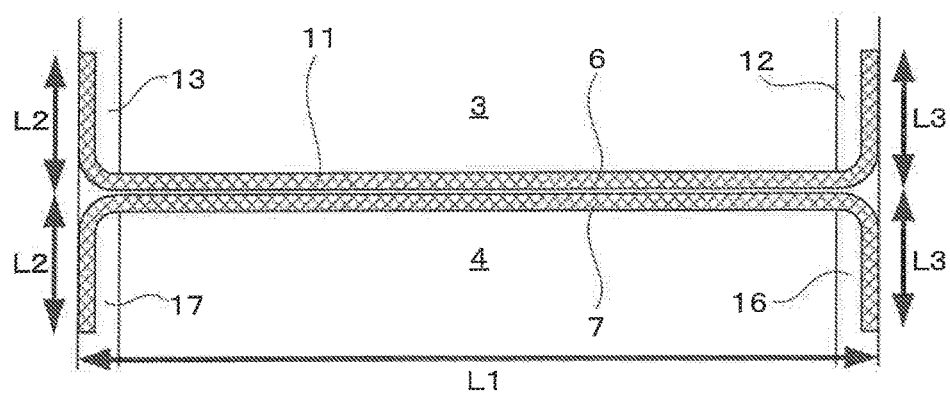
FIG. 5 is a schematic diagram showing the arrangement state of an UD tape in the battery case according to the first embodiment.

It is necessary to set the length of the UD tapes 6, 7 to the length longer than the first side wall 11. Specifically, as shown in FIG. 5, the length of the UD tapes 6, 7 is the length obtained by adding the length L1 of the first side wall 11, the length L2 arranged along the second side walls 12, 16, and the length L3 arranged along the third side walls 13, 17. The length L2 is the length necessary to surely fuse the UD tapes 6, 7 and the second side walls 12, 16, for example, the length L2 is one fourth or more of the length of the second side walls 12, 16. In the same as the length L2, the length L3 is the length necessary to surely fuse the UD tapes 6, 7 and the third side walls 13, 17, for example, the length L3 is one fourth or more of the length of the third side walls 13, 17. Basically, although as the lengths L2 and L3 become longer, more improvement of the strength of the battery case 1 by the UD tapes 6, 7 can be expected, it is desirable that the length L2 is about one fourth of the length of the second side walls 12, 16, the length L3 is about one fourth of the length of the third side walls 13, 17 since even though the lengths L2, L3 are longer than the required length, greater improvement of the strength of the battery case 1 cannot be expected.

The first storage part 3 and the second storage part 4 are formed integrally with the UD tapes 6, 7 by insert molding in which the resin is injected into a mold where the UD tapes 6, 7 are placed. The UD tape 6 and the UD tape 7 may be fused to each other in advance before insert molding in a section arranged along the first side wall 11, i.e. a section in which the UD tape 6 are arranged adjacent to the UD tape 7, and the resin may be made to flow between the UD tape 6 and the UD tape 7 at the time of insert molding so that the UD tape 6 and the UD tape 7 are fused to each other. It becomes possible that the first storage part 3, the second storage part 4 and the UD tapes 6, 7 are sufficiently fused to each other at the time of insert molding by using the same kind of resin for the resin impregnated into the fiber in the UD tapes 6, 7 and the resin forming the first storage part 3 and the second storage part 4. Further, it is desirable that insert molding is performed with a surface temperature of the UD tapes 6, 7 raised to a temperature (for example, 120° C. at PA6) depending on the kind of the resin at the time of insert molding. As a result, it becomes possible to surely fuse the first storage part 3 and the second storage part 4 to the UD tapes 6, 7.

Figure 6:
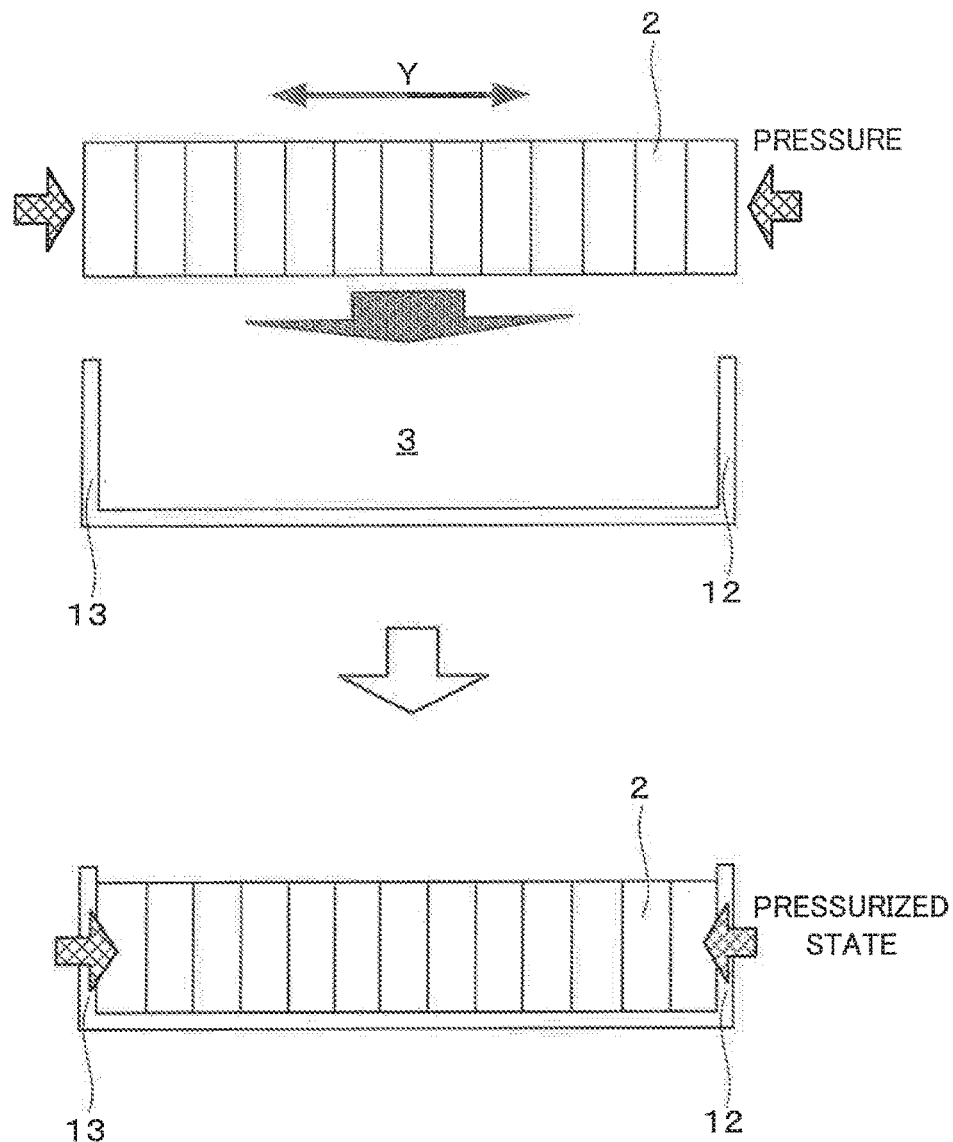
FIG. 6 is an explanatory diagram showing a process of inserting the battery cells into the first storage part and the second storage part.

When the battery cells 2 are inserted into the first storage part 3 and the second storage part 4 having a configuration described above, as shown in FIG. 6, the battery cells 2 are laminated, and are inserted into the first storage part 3 and the second storage part 4 in a compressed state in the lamination direction Y. As a result, it becomes possible that the battery cells 2 laminated and stored in the first storage part 3 are kept in a pressurized state by the second side wall 12 and the third side wall 13, and the battery cells 2 laminated and stored in the second storage part 4 are kept in a pressurized state by the second side wall 16 and the third side wall 17, and thus the battery performance of the battery cells 2 can be improved. In addition, an effect of suppressing the swelling of the battery cells 2 is also brought out. As described above, although the configuration that the battery cells 2 are stored in the first storage part 3 and the second storage part 4 in a compressed state leads to a problem that the battery case 1 could not sustain a load and deforms, decreasing a pressurization value, in the battery case 1 according to the first embodiment, it becomes possible to significantly improve a strength of the first storage part 3 and the second storage part 4 against the load in the lamination direction Y of the battery cells 2 by arranging the UD tape 6 to the first storage part 3 and the second storage part 4 integrally, and thus this technical problem can be solved.

Figure 7:
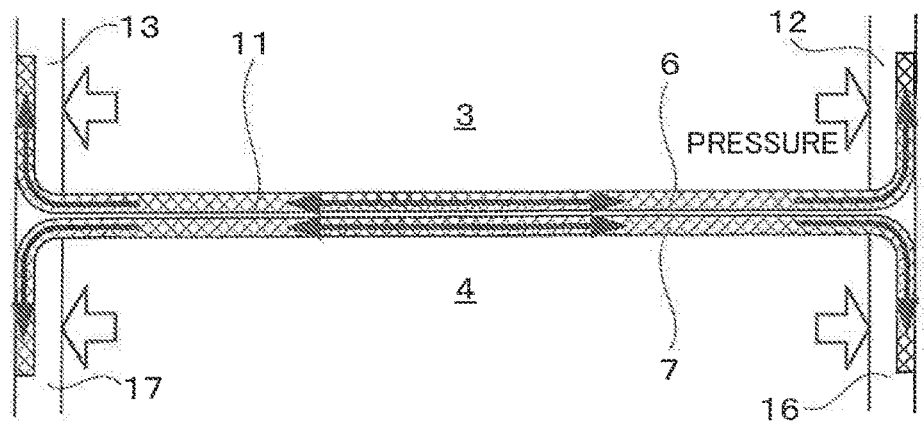
FIG. 7 is an explanatory diagram explaining a mechanism for improving the strength of the first storage part and the second storage part by the UD tape.

Specifically, as shown in FIG. 7, when a load is applied to the second side wall 12 and the third side wall 13 in the lamination direction Y of the battery cells 2, it becomes possible to change the load into a tension load of the UD tape 6 formed integrally with the second side wall 12 and the third side wall 13. When a load is applied to the second side wall 16 and the third side wall 17 in the lamination direction Y of the battery cells 2, it becomes possible to change the load into a tension load of the UD tape 7 formed integrally with the second side wall 16 and the third side wall 17. Since the UD tapes 6, 7 are tapes that fibers are arranged in the longitudinal direction as described above, the UD tapes 6, 7 have the strong tension strength in the longitudinal direction. Accordingly, it becomes possible to improve the strength of the first storage part 3 and the second storage part 4 against the load in the lamination direction Y of the battery cells 2. Further, since as described above, the UD tapes 6, 7 are arranged along the opening end 19 of the side wall, it becomes possible that the opening end 19 to be deformed easily the most when the battery cells 2 are stored in the first storage part 3 and the second storage part 4 can be reinforced by the UD tapes 6, 7.

Figure 8:
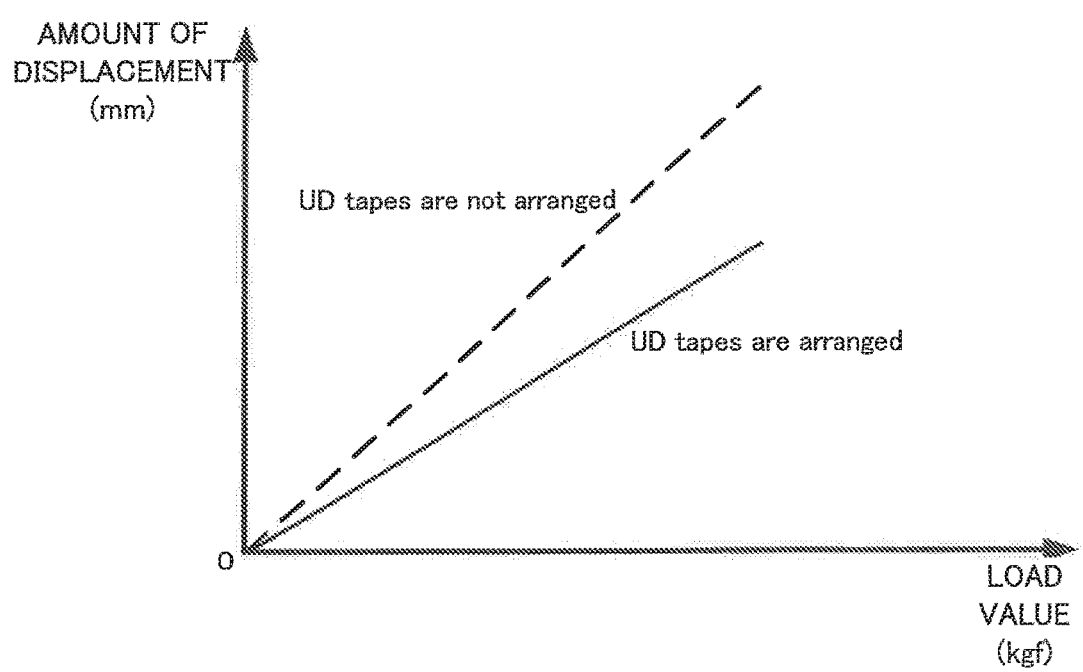
FIG. 8 is a diagram showing a relationship between a load value and a displacement amount of side walls when a load is applied in the lamination direction of the battery cells to a battery case according to the present embodiment to which the UD tapes are arranged and a battery case of the comparative example to which the UD tapes are not arranged.

FIG. 8 is a diagram showing a relationship between a load value and a total value of displacement amounts of the second side wall 12 and the third side wall 13 when a load is applied in the lamination direction Y of the battery cells 2 to a battery case 1 according to the present embodiment to which the UD tapes 6, 7 are arranged and a battery case of the comparative example to which the UD tapes 6, 7 are not arranged. As shown in FIG. 8, in comparison with the battery case of the comparative example to which the UD tapes 6, 7 are not arranged, the displacement amounts of the second side wall 12 and the third side wall 13 are decreased in the battery case 1 according to the present embodiment to which the UD tapes 6, 7 are arranged even when the same load is applied to the battery case 1 according to the present embodiment and the battery case of the comparative example. Namely, it can be perceived that the strength of the first storage part 3 and the second storage part 4 against the load in the lamination direction Y of the battery cells 2 is improved by arranging the UD tape 6 integrally with the first storage part 3 and the second storage part 4.

As described above, the battery case 1 according to the first embodiment includes the first storage part 3 and the second storage part 4 made of resin for storing a laminate of the battery cells 2, the UD tape 6 arranged integrally with the first side wall 11, the second side wall 12, and the third side wall 13 forming the first storage part 3, the UD tape 7 arranged integrally with the first side wall 11, the second side wall 16, and the third side wall 17 forming the second storage part 4, and the UD tapes 6, 7 are arranged from the second side walls 12, 16 to the third side walls 13, 17 through the first side wall 11, thereby becoming possible to significantly improve the strength of the first storage part 3 and the second storage part 4 against the load in the lamination direction Y of the battery cells 2. As a result, when the battery cells 2 are compressed and stored in the first storage part 3 and the second storage part 4, it becomes possible to keep the pressurized state of the stored battery cells 2, thereby improving the battery performance of the battery cells 2. In addition, an effect of suppressing the swelling of the battery cells 2 is also brought out. Further, in comparison with the conventional technique, since it is not necessary to attach a part for pressurizing the battery cells 2 such as a binding band separately, complicating a manufacturing process of a battery module can be prevented. In addition, the number of parts can be decreased and a cost reduction effect can also be expected.

Since a battery case 1 according to the first embodiment is formed integrally with the UD tapes 6, 7 by insert molding in which the resin is injected into a mold where the UD tapes 6, 7 are placed, the UD tapes 6, 7 and the first storage part 3 and the second storage part 4 are surely fused to each other, and it becomes possible to sufficiently bring out an effect of improving the strength of the battery case 1 by the UD tapes 6, 7.

It becomes possible that the UD tapes 6, 7 and the first storage part 3 and the second storage part 4 are surely fused to each other and the effect of improving the strength of the battery case 1 by the UD tapes 6, 7 is brought out sufficiently by using the same kind of resin for the resin impregnated into the UD tapes 6, 7 and the resin forming the first storage part 3 and the second storage part 4.

Since at least one direction of the first storage part 3 and the second storage part 4 is open, and the UD tapes 6, 7 are arranged along the opening end 19 of the side wall, it becomes possible that a place to be deformed easily the most when the battery cells 2 are stored in the first storage part 3 and the second storage part 4 can be reinforced by the UD tapes 6, 7, and thus the deformation of the first storage part 3 and the second storage part 4 is surely prevented.

Since the battery case 1 includes the first storage part 3 and the second storage part 4 adjacent to the first storage part 3 as a storage part of the battery cells 2, the lamination direction Y of the battery cells 2 in the first storage part 3 and the second storage part 4 is the same direction, and the first side wall 11 of the first storage part 3 and the first side wall 11 of the second storage part 4 are erected as one body between the first storage part 3 and the second storage part 4, even when a plurality of the storage parts for storing the battery cells 2 are provided in order to realize a high energy capacity of a battery module, it becomes possible to significantly improve the strength of each storage part against a load in the lamination direction Y of the battery cells 2 while suppressing the use amount of the UD tapes 6, 7. In addition, a downsizing of the battery module can be realized by using the first side wall 11 to which the UD tapes 6, 7 are arranged in common for each of the storage parts.

Second Embodiment

Figure 9:
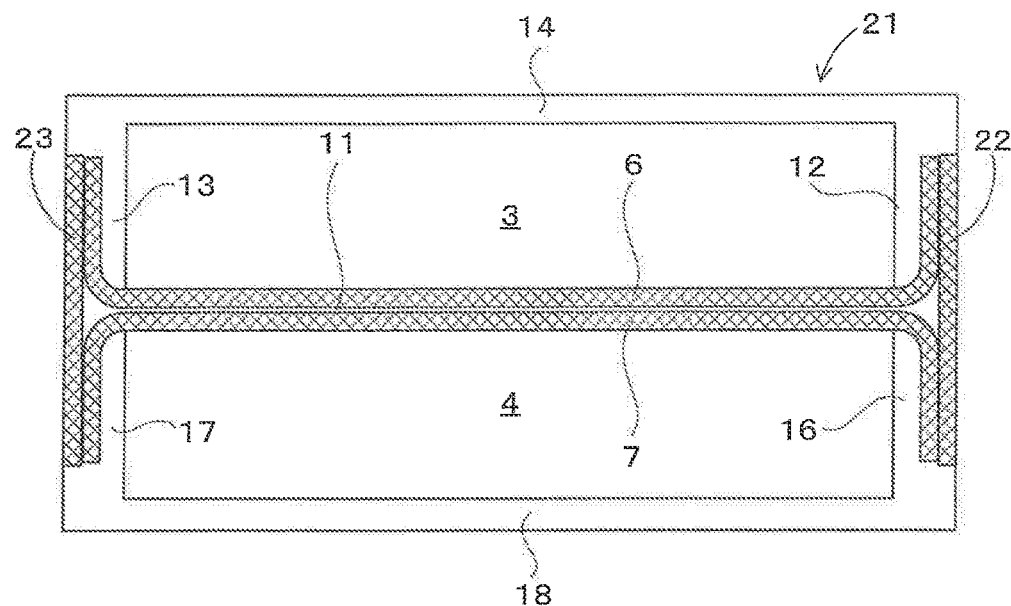
FIG. 9 is a schematic diagram showing the arrangement state of the UD tape in the battery case according to the second embodiment.

Next, the configuration of a battery case 21 according to the second embodiment will be described with reference to FIG. 9. FIG. 9 is a schematic diagram showing the arrangement state of the UD tape in the battery case 21 according to the second embodiment. In the description below, the reference signs same as the configuration of the battery case 1 according to the first embodiment in FIGS. 1 to 8 indicate the configuration same as/corresponding to the configuration of the battery case 1 according to the first embodiment.

The schematic configuration of the battery case 21 according to the second embodiment is almost the same as the schematic configuration of the battery case 1 according to the first embodiment. However, the battery case 21 according to the second embodiment is different from the battery case 1 in that the UD tapes are additionally arranged in a position between the second side wall 12 of the first storage part 3 and the second side wall 16 of the second storage part 4 and a position between the third side wall 13 of first storage part 3 and the third side wall 17 of the second storage part 4 in addition to the UD tape 6 arranged from the second side wall 12 to the third side wall 13 through the first side wall 11 and the UD tape 7 arranged from the second side wall 16 to the third side wall 17 through the first side wall 11.

As shown in FIG. 9, in the battery case 21 according to the second embodiment, while an UD tape 22 is arranged in a position between the second side wall 12 of the first storage part 3 and the second side wall 16 of the second storage part 4, an UD tape 23 is arranged in a position between the third side wall 13 of the first storage part 3 and the third side wall 17 of the second storage part 4. As described above, although when a load is applied to the second side walls 12, 16 and the third side walls 13, 17 in the lamination direction Y of the battery cells 2, it becomes possible to change the load into the tension load of the UD tapes 6, 7 (see FIG. 7), it becomes possible to further improve the strength against the tension load of the UD tapes 6, 7 by additionally arranging the UD tape 22 and the UD tape 23 in the battery case 21 according to the second embodiment. Although it is possible to arrange either only one of the UD tape 22 and the UD tape 23, it is desirable to arrange both of the UD tape 22 and the UD tape 23 in order to further improve the strength of the battery case 21.

The UD tapes 22, 23 may be arranged integrally with the side walls forming the first storage part 3 and the second storage part 4 together with the UD tapes 6, 7, and the UD tapes 22, 23 may be attached to the formed first storage part 3 and second storage part 4 from the outside. When the UD tapes 22, 23 are arranged integrally with the side walls forming the first storage part 3 and the second storage part 4 together with the UD tapes 6, 7, for example, the first storage part 3 and the second storage part 4 are formed integrally with the UD tapes 6, 7, 22, and 23 by insert molding in which the resin is injected into a mold where the UD tapes 6, 7, 22, and 23 are placed. The UD tapes 6, 7 and the UD tapes 22, 23 may be fused to each other in advance before insert molding in a section in which the UD tapes 6, 7 are arranged adjacent to the UD tapes 22, 23, and the resin may be made to flow between the UD tapes 6, 7 and the UD tapes 22, 23 at the time of insert molding so that the UD tapes 6, 7 and the UD tapes 22, 23 are fused to each other.

As described above, since in the battery case 21 according to the second embodiment, the UD tape 22 is additionally arranged from the second side wall 12 of the first storage part 3 to the second side wall 16 of the second storage part 4, and the UD tape 23 is additionally arranged from the third side wall 13 of the first storage part 3 to the third side wall 17 of the second storage part 4, it becomes possible to further improve the strength of each storage part by the UD tapes 22, 23 arranged between the side wall of the first storage part 3 and the side wall of the second storage part 4.

Third Embodiment

Figure 10:
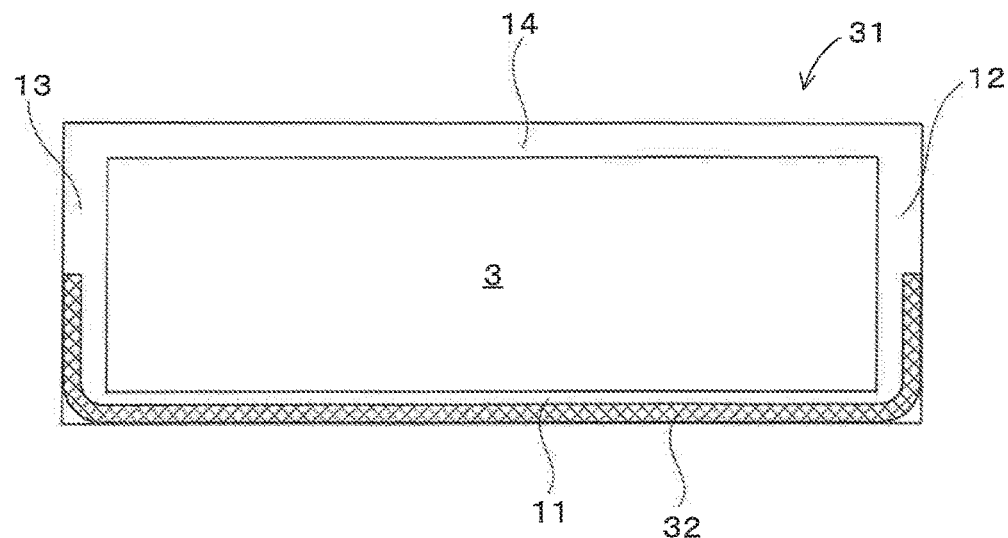
FIG. 10 is a schematic diagram showing the arrangement state of the UD tape in the battery case according to the third embodiment.

Next, the configuration of a battery case 31 according to the third embodiment will be described with reference to FIG. 10. FIG. 10 is a schematic diagram showing the arrangement state of the UD tape in the battery case 31 according to the third embodiment. In the description below, the reference signs same as the configuration of the battery case 1 according to the first embodiment in FIGS. 1 to 8 indicate the configuration same as/corresponding to the configuration of the battery case 1 according to the first embodiment.

The schematic configuration of the battery case 31 according to the third embodiment is almost the same as the configuration of the battery case 1 according to the first embodiment. However, the battery case 31 according to the third embodiment is different from the battery case 1 according to the first embodiment in that only the first storage part 3 is provided as a storage part for storing the battery cells 2.

As shown in FIG. 10, in the battery case 31 according to the third embodiment, an UD tape 32 is arranged from the second side wall 12 to the third side wall 13 through the first side wall 11. The UD tape 32 may be arranged from the second side wall 12 to the third side wall 13 through the fourth side wall 14. In this case, an effect of improving the strength of the battery case 21 can also be brought out.

Further, the UD tape 32 may be arranged in each of the four positions, i.e. a position between the second side wall 12 and the first side wall 11 and a position between the first side wall 11 and the third side wall 13, and a position between the second side wall 12 and the fourth side wall 14 and a position between the fourth side wall 14 and the third side wall 13. In this case, a remarkable effect of improving the strength of the battery case 21 can be brought out.

The first storage part 3 is formed integrally with the UD tape 32 by insert molding in which the resin is injected into a mold where the UD tape 32 is placed in the same way as the first embodiment.

As described above, even when the battery case 31 according to the third embodiment has the first storage part 3 only, it becomes possible to improve the strength of the first storage part 3 by the UD tape 32 arranged between each of the side walls of the first storage part 3.

It should be understood that the present invention is not limited to embodiments as described above, and the various changes, substitutions, and alterations could be made hereto without departing from the spirit and scope of the invention.

For example, although the nylon 6 (PA6) is used as a resin forming the first storage part 3 and the second storage part 4 in the first to third embodiments, the resin other than the nylon 6 may be used.

In the first to third embodiments, although the resin forming the first storage part 3 and the second storage part 4 and the resin impregnated into the fibers of the UD tapes 6, 7, 22, 23, and 32 are the same kind, a different kind of resin may be used if an effect of fusing the UD tapes 6, 7, 22, 23, 32 to the first storage part 3 and the second storage part 4 can be sufficiently brought out.

Although the side wall to which the UD tapes 6, 7 are arranged along the lamination direction Y of the battery cells 2 is the first side wall 11 erected between the first storage part 3 and the second storage part 4 in the first and second embodiments, the UD tapes 6, 7 may be arranged to the fourth side walls 14, 18 that is an outer wall of the battery case 1 instead of the first side wall 11. However, an effect of improving the strength of the battery case becomes greater when the UD tapes 6, 7 are arranged to the first side wall 11 (i.e. center rib) erected between the first storage part 3 and the second storage part 4.

REFERENCE SIGNS

1: battery case
2: battery cells
3: first storage part
4: second storage part
6, 7: UD tape
10, 15: bottom plate
11: first side wall
12, 16: second side wall
13, 17: third side wall
14, 18: fourth side wall
19: opening end

The invention claimed is:
1. A battery case comprising:

a storage part made of resin for storing a laminate of battery cells; and a fiber tape arranged integrally with side walls forming the storage part and formed by impregnating fiber arranged in a longitudinal direction with resin, wherein the side walls include a first side wall erected along a lamination direction of the battery cells, and a second side wall and a third side wall continued from the first side wall, erected in a direction intersecting with the lamination direction of the battery cells, the second side wall and the third side wall are holding the laminate of the battery cells in a pressurized state from both ends in the lamination direction, the fiber tape is arranged from the second side wall to the third side wall through the first side wall, the storage part includes a first storage part and a second storage part adjacent to the first storage part, the lamination direction of the battery cells in the first storage part and the second storage part is the same direction, the first side wall is one body between the first storage part and the second storage part, and additional fiber tape is arranged in a position along the second side wall from the first storage part to the second storage part, and/or a position between the third side wall from the first storage part to the second storage part.

2. The battery case according to claim 1, wherein
the storage part is formed integrally with the fiber tape by insert molding in which the resin is injected into a mold where the fiber tape is placed.

3. The battery case according to claim 1, wherein
the resin impregnated into the fiber tape and the resin forming the storage part are the same kind.

4. The battery case according to claim 1, wherein
at least one direction of the storage part is open, and
the fiber tape is arranged along an opening end of the side wall.

* * * * *